(12) United States Patent
Denio et al.

(10) Patent No.: US 6,556,575 B1
(45) Date of Patent: Apr. 29, 2003

(54) BROADCAST TRAFFIC REDUCTION IN A COMMUNICATIONS NETWORK

(75) Inventors: Michael A. Denio, Plano, TX (US); Denis R. Beaudoin, Rowlett, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/338,446

(22) Filed: Jun. 22, 1999

Related U.S. Application Data

(60) Provisional application No. 60/090,665, filed on Jun. 25, 1998.

(51) Int. Cl.$^7$ ................................................ H04L 12/56
(52) U.S. Cl. .................................................... 370/401
(58) Field of Search ........................... 370/400, 401, 370/402, 403, 404, 405

(56) References Cited

U.S. PATENT DOCUMENTS

| | | | |
|---|---|---|---|
| 5,530,703 A | * 6/1996 | Liu et al. | 370/402 |
| 5,684,800 A | 11/1997 | Dobbins et al. | |
| 5,920,699 A | * 7/1999 | Bare | 709/225 |
| 6,157,644 A | * 5/2000 | Bernstein et al. | 370/401 |
| 6,115,385 A | * 9/2000 | Vig | 370/401 |

OTHER PUBLICATIONS

"Virtual LANs Get Real—Ethernet Switch Makers are Taking the Lead in Deploying Virtual LANs Across Campus Networks", Data Communications, vol. 24, No. 3,U.S., McGraw Hill, New York, Mar. 1,1995, pp. 87–92, 94, 96, (Data Communications Staff).

* cited by examiner

Primary Examiner—Chau Nguyen
Assistant Examiner—Keith M. George
(74) Attorney, Agent, or Firm—Dana L. Burton; W. James Brady; Frederick J. Telecky, Jr.

(57) ABSTRACT

The present invention includes a method and system for routing broadcast packets in a network (250) using a switching device (200) which is operable to interconnect sub-portions (202, 204) of the network (250). Each network (250) sub-portion (202, 204) is connected to at least one of a plurality of switch ports (232, 236, 240, 244) on the switching device (200). The switching device (200) is further operable to forward certain ones of the broadcast packets between the sub-portions (202, 204) of the network (250) via the switch ports (232, 236, 240, 244) in accordance with a forwarding algorithm and to forward all other of the broadcast packets to a processor (320). The processor (320) is communicatively connected to the switching device (200) and is operable to forward the other ones of the broadcast packets in accordance with a set of pre-defined broadcast routing heuristics.

6 Claims, 2 Drawing Sheets

BROADCAST TRAFFIC REDUCTION IN A COMMUNICATIONS NETWORK

This amendment claims priority under 35 USC§119(e)(1) of provisional application No. 60/090,665 filed Jun. 25, 1998.

TECHNICAL FIELD OF THE INVENTION

This invention relates generally to packet switching and in particular to a method and system of reducing broadcast packet traffic through a switching device.

BACKGROUND OF THE INVENTION

Internetworking refers to linking individual local area networks (LANs) or LAN segments together to form one integrated, seamless network. One example of internetworking LANs, in a broad sense, is the Internet in which a collection of computer networks worldwide are linked together. Repeaters, bridges, routers, gateways, and switches are devices most often used for internetworking.

The simplest internetworking device, the repeater, regenerates signals that have been attenuated and/or distorted, thus permitting the signal to be transmitted greater distances. The repeater operates at the physical layer of the Open System Interconnection (OSI) reference model.

The OSI reference model is a standard produced by the International Organization for Standardization (ISO) for worldwide communications that defines a framework for implementing communications protocols. The framework consists of seven layers. The various layers refer to software protocol levels, with each layer performing functions for the layers above it. The layers, as shown in the OSI Reference Model 100 in FIG. 1 include an application layer 102, a presentation layer 104, a session layer 106, a transport layer 108, a network layer 110, a data link layer 112, and a physical layer 114.

The application layer 102 defines program-to-program communications. The presentation layer 104 manages data representation conversions, i.e., converting from EBCDIC to ASCII. The session layer 106 is responsible for establishing and maintaining communications channels. The session layer 106 is sometimes combined with the transport layer 108 which is responsible for end-to-end integrity of data transmission. The network layer 110 defines the protocol for routing data from one node to another while the data link layer 112 is responsible for physically passing the data from one node to another. Functions such as error control, addressing, and flow control are also performed in the data link layer 112. Finally, the physical layer 114 manages the placement of data onto and removal of data from the network media.

A bridging device typically is a two port device which connects two LANs together and forwards (or filters) data packets between the two LANs based on their destination address. The bridging device operates at the data link 112 (or media access control (MAC)) layer in the OSI reference model 100.

A routing device is a host that is connected to more than one LAN and routes messages between them based on specific protocol rather than by packet address. In other words, while repeaters and bridging devices link together two or more LANs that use the same protocol, the routing device is used to link together two or more LANs that operate different protocols. Thus, while the repeater operates at the physical layer 114 and the bridging device operates at the data link layer 112 in the OSI reference model 100, the routing device, which routes data between two or more LANs using one of many different protocols, operates at the network layer 110. In other words, the routing device interconnects two or more LANs (or divides one LAN into two or more LAN segments) logically rather than physically.

Another difference between the routing device and the lower complexity repeater and bridging device is that the routing device is not transparent to other nodes on the network but is itself a host, i.e., an addressable node. A host is generally a node on a network that can be used interactively, i.e., logged into, like a computer. Each host, or node, has one or more associated addresses, including at least one fixed hardware address assigned by the device manufacturer. Most nodes also have a protocol specific address, such as an Internet protocol (IP) address, which is assigned by a network manager.

The gateway is the most complex of the internetworking devices. It operates across all seven layers of the OSI reference model 100 and provides a complete hardware and software translation between the networks it connects. The gateway thus functions to connect networks of different architectures and operating under different protocols.

A switching device, on the other hand, is a multiport device designed to increase network performance by allowing only certain traffic on the individual LANs or LAN segments attached to its ports. The switching device forwards packets between LANs based upon both their source and destination addresses. Thus, traffic is routed between only those ports that require it. Each port on the switching device may be connected to a single computer or to a concentrator, or hub, which allows the bandwidth of the port to be shared among several users.

It is very common in network topology design to have a central file server or default router stationed off a single port on the switching device. Inter-host traffic reduction is obtained on the switching device through the use of virtual LANs (VLANs), i.e., subdividing the hosts connected to the switching device into individual sub-nets.

The switching device may be a managed switch. Switches are commonly managed by simple network management protocol (SNMP) applications. These SNMP applications communicate with the managed devices using a communications protocol, such as internet protocol (IP). All managed devices, including the switch, thus have one or more IP addresses. Workgroups, which include clients, servers, or clients and servers, appear as one or more IP sub-nets. A sub-net is a group of devices whose IP addresses have the same prefix. A device which belongs to more than one sub-net will thus have multiple IP addresses, i.e., one for each sub-net.

An IP address includes a network address component and a host address component. The sub-net to which a device belongs is identified using a sub-net mask. The sub-net mask is the network address plus the bit or bits reserved for identifying the sub-net. The sub-net mask is called a mask in that by performing a bitwise AND operation on the IP address and the sub-net mask, the sub-net to which the IP address belongs is identified.

By dividing a network into sub-nets, traffic reduction between devices on different sub-nets is achieved. A traffic problem persists with the server and router, however, in that in order to serve multiple hosts, or route between VLANs or IP sub-nets, the server and router ports must see all broadcast traffic from all hosts. Although this problem can be alleviated by substituting a router in place of the switching device, this is not a preferred solution. First, router cost per port is significantly greater than switch cost per port. Secondly, routing devices cause increased network latencies (the amount of time required to determine if a packet should be filtered or forwarded).

There is currently no solution to the heavy broadcast traffic load to servers and routers and other similar devices stationed off a switch port.

SUMMARY OF THE INVENTION

The present invention is a method and system for processing broadcast packets in a network using a switching device which interconnects sub-portions of the network. Each network sub-portion is connected to at least one of a plurality of switch ports on the switching device. The switching device is operable to forward certain of the broadcast packets between the sub-portions of the network via the switch ports in accordance with a forwarding algorithm. Certain of the switch ports are identified as filtered ports. Packets received through one of the switch ports include a destination port identifier. If the destination port is not a filtered port, the present invention forwards the received packet in accordance with the switch forwarding algorithm. If the destination port is a filtered port, the present invention is operable to forward the received packet to a data processor. The data processor is operable to forward the received packet in accordance with a set of broadcast forwarding heuristics.

An object of the present invention is to reduce broadcast packet traffic on selected ports on the switching device.

Another object of the present invention is to implement broadcast packet routing using a set of broadcast forwarding heuristics.

These and other features of the invention that will be apparent to those skilled in the art from the following detailed description of the invention, taken together with the accompanying drawings.

DETAILED DESCRIPTION OF THE INVENTION

Figure 1:
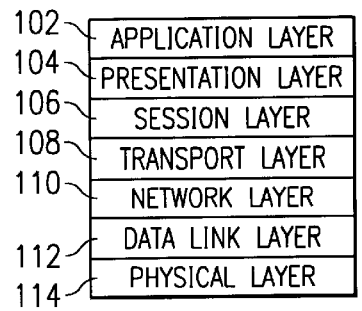
FIG. 1 shows the OSI reference model.
Figure 2:
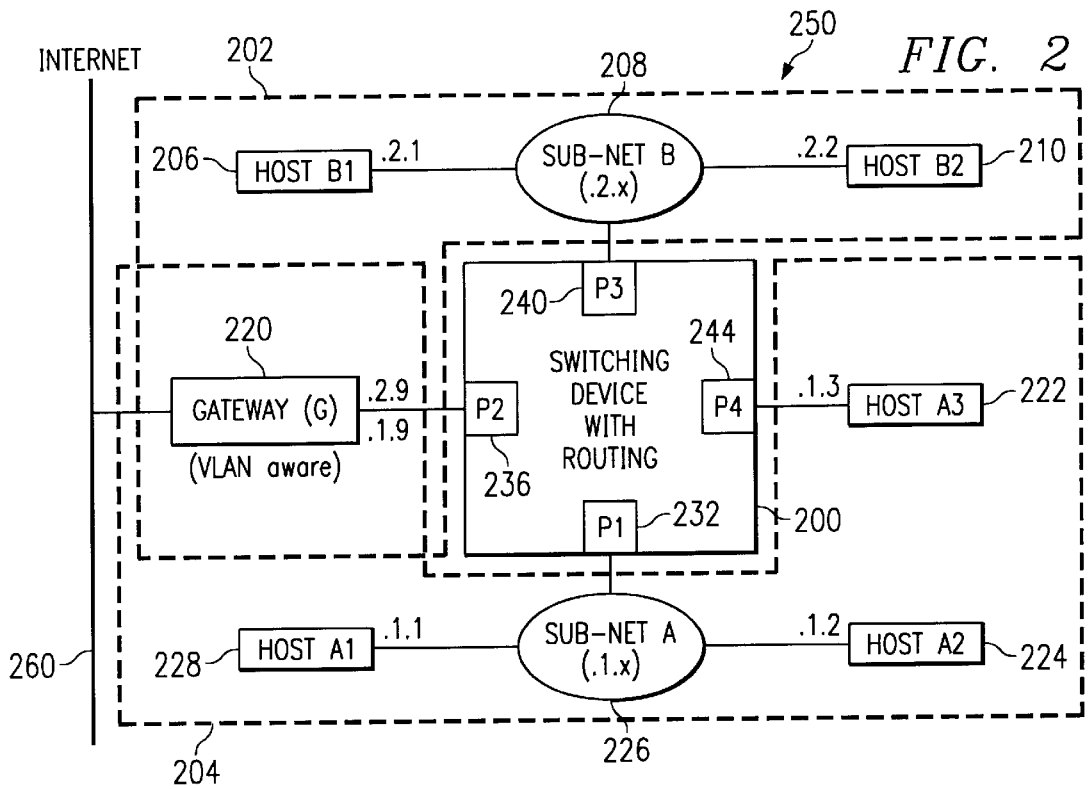
FIG. 2 is a block diagram of an exemplary network interconnected using a switching device in accordance with the present invention.

FIG. 2 illustrates an exemplary network 250 interconnected using a switching device 200 in accordance with the present invention. The switching device 200 includes four ports P1 232, P2 236, P3 240, and P4 244 which interconnect devices on two sub-nets, sub-net A 204 and sub-net B 202. Sub-net A 204 includes Host A3 222 (which is connected through port P4 244 of the switching device 200), a sub-net 226 (which interconnects two devices, Host A1 228 and Host A2 224, through port P1 232 of the switching device 200), and gateway 220 (which is connected through port P2 236 of the switching device 200). Sub-net B 202 includes a sub-net 208 (which interconnects two devices, Host B1 206 and Host B2 210, through port P3 240 of the switching device 200), and the gateway 220.

The host address portion of each device in the network 250 shown in FIG. 2 is also shown. Host B1 206 has a host address of .2.1, Host B2 210 has a host address of .2.2, etc. Note that the gateway 220, which is a multi-homed device, has two host addresses, .2.9 and .1.9, one for each of the sub-nets, sub-net A 204 and sub-net B 202, in which it is a member. The gateway 220 connects the network 250 to other devices, not shown, through Internet connection 260.

Figure 3:
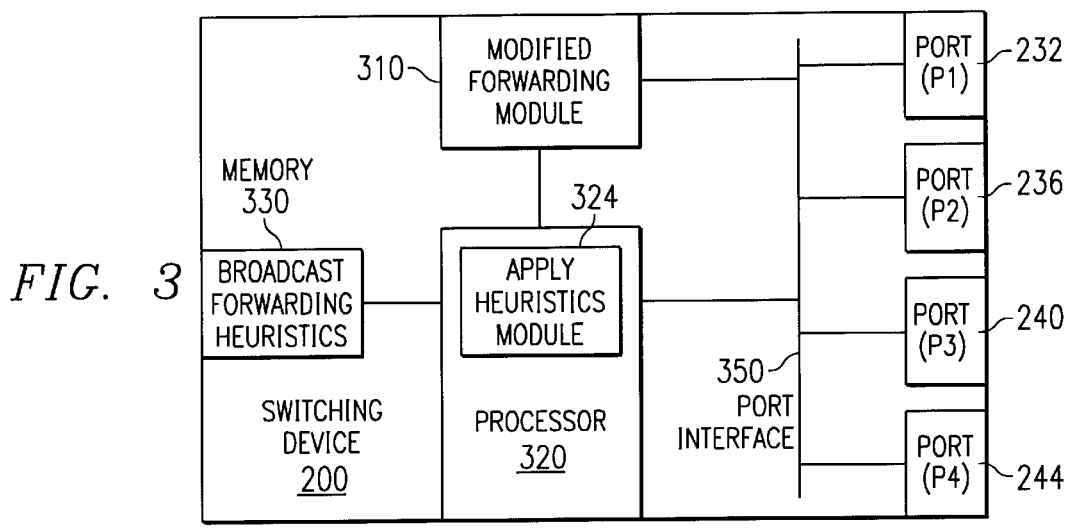
FIG. 3 shows a detailed block diagram of the switching device of the present invention.

FIG. 3 depicts the switching device 200 of the present invention in more detail. The switching device 200 includes a modified forwarding module 310 which forwards most packets it receives through bus interface 350 from the ports P1 232, P2 236, P3 240, P4 244 in accordance with a standard forwarding algorithm. Broadcast packets received by the switching device 200 destined for certain ports P1 232, P2 236, P3 240, P4 244, however, in the preferred embodiment of the present invention, are transferred to data processor 320 which executes apply heuristics module 324 to generate instructions for forwarding the broadcast packets in accordance with broadcast forwarding heuristics stored in memory 330. The data processor 320 may be a microprocessor or a programmed digital signal processor. The broadcast packets which are determined to require forwarding by the apply heuristics module 324 are then transferred through port interface 350.

Referring again to FIG. 2, for example, the switching device (S) is connected to two networks (sub-nets A and B), plus a default gateway router (G). This is a common topology for a switch (a topology with a central file server, not shown, in place of Host A3 would be similar). Note that the gateway router (G) is VLAN aware and multi-homed (i.e., it is part of both sub-net A and sub-net B), and thus can route between sub-nets on individual VLANs. In FIG. 2, the basic VLAN aware switching device (S) that is connected between sub-net A and sub-net B has no routing capabilities.

The network topology shown in FIG. 3 provides for good traffic reduction between sub-net A and sub-net B, but unfortunately in a typical switch configuration, the gateway (G) on port P2 of the switching device (S) would be forwarded all broadcast traffic for both sub-nets A and B. This is because, although the gateway (G) is a well-known device, the gateway (G) must see a sub-set of all broadcast traffic (e.g., address resolution protocol (ARP) requests for network addresses .1.9 and .2.9, Internet control message protocol (ICMP) router solicitations, routing information protocol (RIP) packets etc.), and the switching device (S) cannot normally distinguish between useful and non-useful broadcast packets.

The present invention addresses the problem by the addition of a rudimentary routing ability to the switching device 200. In the present invention as illustrated in FIG. 2, the switching device 200 acts as a "broadcast router" for gateway (G) on both sub-nets A and B. This feature is practically free since the switching device 200 must listen to the all broadcast traffic in order to provide a standard management interface. The broadcast router-like features added to the switching device 200 of the present invention includes a modified forwarding module 310 that allows the switching device 200 to filter out all broadcast traffic for specified ports P1 232, P2 236, P3 240, P4 244. The data processor 320 executing an algorithm which generates forwarding instructions in accordance with broadcast forwarding heuristics then forwards any broadcast traffic to the specified ports that devices on those ports need to see.

Figure 4:
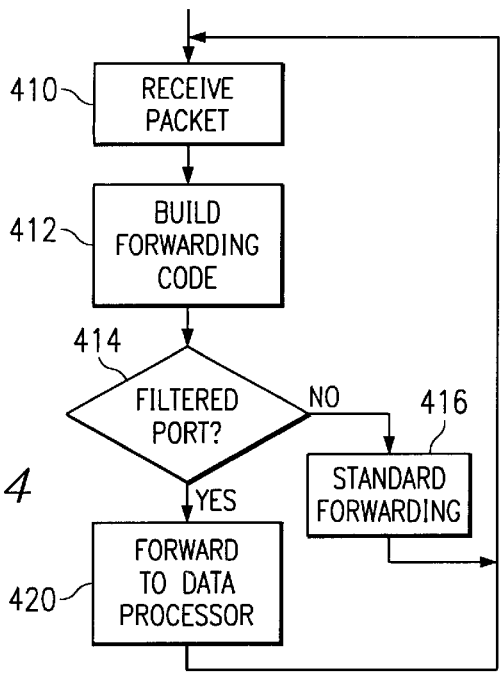
FIG. 4 is a flow diagram illustrating operation of the modified forwarding algorithm of the switching device of the present invention.

FIG. 4 shows a flow chart illustrating operation of the modified forwarding module 310 in accordance with the present invention. As shown at block 410, a packet is received by the switching device 200 from one of the ports P1 232, P2 236, P3 240, P4 244. Processing then proceeds to block 412 where a forwarding code is constructed which identifies the destination port. At decision block 414, if the destination port is not a filtered port, processing continues at block 416 where the switching device 200 executes its standard forwarding algorithm. Whether a port is a filtered port or not is predetermined and the information stored, for example, in a look-up table or hard-wired into the switching device 200. Other means of identifying ports as filtered or unfiltered will be readily apparent to one skilled in the art. If, at decision block 414, it is determined that the destination port is a filtered port, operation continues at block 420 where the forwarding code is transferred to the data processor 320.

Figure 5:
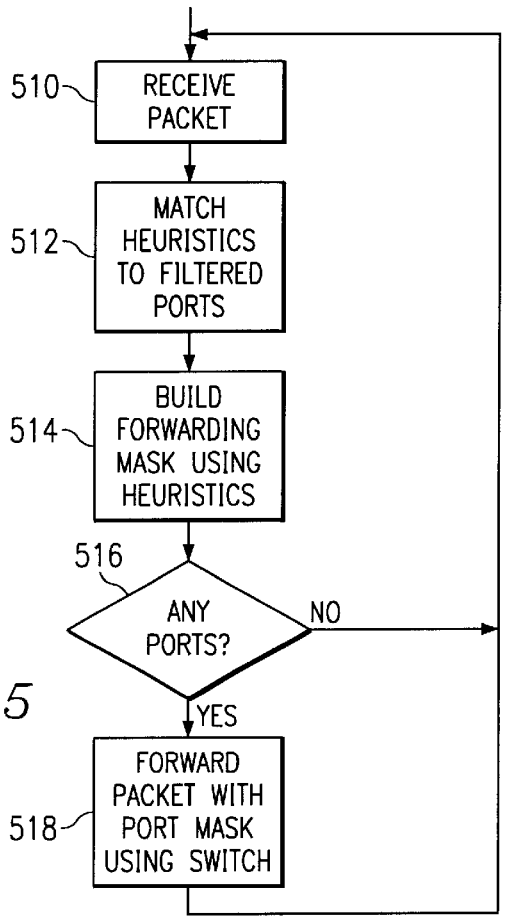
FIG. 5 shows a flow diagram illustrating operation of the data processing device included in the switching device in accordance with the present invention.

FIG. 5 depicts a flow chart illustrating operation of the apply heuristic module 324 in accordance with the present invention. At block 510, a packet is received from the switching device 200. Operation then continues at block 512 where the broadcast forwarding heuristics from the memory 330 are matched to the filtered ports identified. At block 514 a forwarding mask is constructed using the retrieved broadcast forwarding heuristics. Processing then continues at decision block 516 where, if no ports are specified in the resulting forwarding mask, i.e., the forwarding mask is all zero, processing continues at block 510 to retrieve the next packet. If, at decision block 516, the forwarding mask identifies ports to forward the packet to, then processing continues at block 518 where the broadcast packet, along with the associated port mask is transferred to the switching device 200 for forwarding to the appropriate port or ports.

As discussed hereinabove, broadcast routing is implemented in the present invention using a collection of broadcast forwarding heuristics for each port P1 232, P2 236, P3 240, and P4 244 participating in broadcast traffic reduction. The broadcast routing heuristics are stored in the memory 330 which, although shown internal to the switching device 200, may be externally located. The broadcast routing heuristics may be either inclusive (defining what packets to forward) or exclusive (defining what packets not to forward), or a combination of both inclusive and exclusive broadcast routing heuristics.

Inclusive rules allow for greater traffic reduction in that only specifically defined traffic is forwarded. Given the network configuration illustrated in FIG. 2, exemplary inclusive heuristics for port P2 236 include:

1) FORWARD: ARP packets addressed to gateway (G) 220 (.1.9 or .2.9) to port P2 236, and
2) FORWARD: IP broadcast packets (e.g., RIP, ICMP router solicitation) to port P2 236.

Exclusive rules allow for less traffic reduction in that they only specify what not to forward. However, exclusive rules allow the network administrator to be more specific in the exact type of packet traffic to filter. An exemplary exclusive heuristic includes:

1) DO NOT FORWARD: ARP packets NOT addressed to gateway (G) (.1.9 or .2.9) to port P2 236.

An even more specific exclusive heuristic (allowing more flexibility in forwarding unknown packets) is as follows:

1) DO NOT FORWARD: ARP packets addressed to hosts KNOWN NOT to be port P2 236.

The type of broadcast forwarding applied depends on the specific network configuration used.

Using the network 250 shown in FIG. 2, the following example further illustrates the operation of the present invention. The example has been significantly simplified from an actual implementation. First, assume the application of the following filter and forwarding heuristics for the four ports P1 232, P2 236, P3 240, and P4 244 shown in the FIG. 2.

1) Port P1 232 is FILTERED. Since the only unwanted broadcast/multicast packets are those destined for ports P2 236 and P4 244, port P1 232 uses the following exemplary exclusive forwarding heuristic:
   a) Do not forward broadcast IP packets destined for network addresses .1.9 or .1.3.
2) Port P2 236 is FILTERED. Since there is only one host on port P2 236 (.1.9), port P2 236 uses the following exemplary inclusive forwarding heuristics:
   a) Forward broadcast IP packets for network address .2.9.
   b) Forward broadcast IP packets for network address .1.9.
3) Port P3 240 will never see unwanted broadcast traffic since only one client (.2.9) is reachable via the switch. Therefore, port P3 240 is UNFILTERED.
4) Port P4 244 is FILTERED. Assuming port P4 244 connects only a single client (.1.3), port P4 244 uses the following simple exemplary inclusive forwarding heuristic:
   a) Forward broadcast IP packets for network address .1.3.

A broadcast filtering mask is constructed for the above ports where the first least significant bit (bit 0) represents port P1 232, the second bit (bit 1) represents port P2 236, and so on. Assuming the bits in the filtering mask are SET to logical '1' to indicate filtering, the filtering mask for the above switch is [1011], where port P3 240 (bit 2) is the only unfiltered port.

For the following example packets, assume the switch mechanics generate a forwarding code for each packet received. The forwarding code is constructed such that the first least significant bit (bit 0) represents port P1 232, the second bit (bit 1) represents port P2 236, and so on. Assume the bits are SET to logical '1' in the mask if a packet is to be forwarded to the corresponding port.

The first example is that port P2 236 receives a broadcast packet on VLAN B. The packet should be forwarded to all VLAN B members, and thus a forwarding code of [0100] is constructed such that port P3 240 is the destination of the packet. In the present invention, the forwarding code is then combined with the filtering mask using a bitwise AND operation to determine if any filtering/forwarding heuristics apply. In this case, the result of the AND operation is NULL [0000], thus no filtering or broadcast forwarding heuristics apply. The packet is thus forwarded as usual.

Consider a second example where port P1 232 receives a broadcast IP packet destined for IP address .1.9 (e.g., an ARP request). Since port P1 232 is on VLAN A, and all VLAN A members are to receive broadcast packets, a forwarding code of [1010] is generated to indicate that ports P2 236 and P4 244 are to receive the packet. As with the previous example, the forwarding code is then combined with the filtering mask using a bitwise AND operation to determine if any filtering/forwarding heuristics apply. In this case, the result of the AND operation is [1010], indicating that forwarding heuristics do apply. Here, the packet is forwarded to the apply heuristics module 324 (which is executed by the data processor 320), which builds a new forwarding mask.

Using the heuristics supplied above, the apply heuristics module 324 executed by the data processor 320 determines that the packet SHOULD be forwarded to port P2 236, but NOT to port P4 244. The apply heuristics module 324 executing on the data processor 320 then constructs a new forwarding code of [0010] to indicate that port P2 236 is the only destination port for this packet. The code generated by the apply heuristics module 324 [0010] is combined with the original forwarding code [1010] and the filtering mask [1011] to create the final forwarding code. This allows the inclusion of non-filtered ports. In this case, the original forwarding code [1010] does not include any non-filtered ports and thus the final forwarding code is [0010].

Forwarding broadcast packets using the data processor 320 increases transmission latency of the packet. This is not a concern however since although broadcast packets contribute a significant amount to the total traffic on the network, they are generally not used once a communications link has been established. The fact that all ports see broadcasts, and that established connections are more private, leads to the problem that broadcast packets can clog a switched network even though they are in themselves a very insignificant portion of any particular network conversation.

OTHER EMBODIMENTS

Although the present invention and its advantages have been described in detail, it should be understood that various changes, substitutions and alterations can be made herein without departing from the spirit and scope of the invention as defined by the appended claims.

What is claimed is:

1. A method for processing broadcast packets in a network, the method comprising the steps of:

interconnecting sub-portions of the network using a switching device, each network sub-portion connected to at least one of a plurality of switch ports on the switching device, the switching device operable to forwarding certain of the broadcast packets between the sub-portions of the network via the switch ports in accordance with a forwarding algorithm;

predetermining certain of the switch ports as filtered ports;

receiving a packet through one of the switch ports;

generating a destination port identifier indicating one or more of the switch ports as destination ports;

if said destination ports do not include a filtered port, forwarding said received packet in accordance with the switch forwarding algorithm; and if said destination ports include a filtered port, forwarding said received packet to a data processor.

2. The method of claim 1 wherein said data processor is operable to forward said received packet in accordance with a set of broadcast forwarding heuristics.

3. The method of claim 2 wherein said data processor is operable to forward said received packet to said destination port in accordance with those of said set of broadcast forwarding heuristics which are associated with said destination port.

4. A system for routing broadcast packets in a network, comprising:

a switching device operable to interconnect sub-portions of the network, each sub-portion connected to at least one of a plurality of switch ports on the switching device, the switching device further operable to generate a destination port identifier indicating one or more of the switch ports as destination ports for a broadcast packet and to forward the broadcast packet if said destination ports do not include a filtered port in accordance with a forwarding algorithm and to forward the broadcast packet if said destination ports include a filtered port to a processor; and said processor communicatively connected to said switching device and operable to forward said broadcast packet.

5. The system of claim 4 wherein said processor is operable to forward said certain other ones of the broadcast packets in accordance with a set of pre-defined broadcast routing heuristics.

6. The system of claim 5 wherein said processor is operable to forward said certain other ones of the broadcast packets to a destination port on said switch in accordance with those of said set of pre-defined broadcast routing heuristics which are associated with said destination port.

* * * * *